US005388800A

United States Patent [19]

Fry

[11] Patent Number: 5,388,800

[45] Date of Patent: Feb. 14, 1995

[54] PROTECTIVE GUARD FOR A SECURITY ALARM DEVICE

[76] Inventor: Jessie B. Fry, 3522 Littlestone Dr., Arlington, Tex. 76014

[21] Appl. No.: 84,612

[22] Filed: Jul. 1, 1993

[51] Int. Cl.[6] .............................................. F16M 13/02

[52] U.S. Cl. .......................................... 248/551; 49/50

[58] Field of Search ............... 404/6, 8; 248/551, 552, 248/553; 52/27; 74/608; 362/376, 404; 49/50, 51

[56] References Cited

U.S. PATENT DOCUMENTS

| | | | |
|---|---|---|---|
| D. 301,685 | 6/1989 | Vories | D8/737 |
| 4,344,114 | 8/1982 | Denhart | 362/147 |
| 4,353,521 | 10/1982 | Webb | 248/551 |
| 4,514,932 | 5/1985 | Janis | 49/50 |
| 5,149,039 | 9/1992 | Peterson et al. | 248/300 |

*Primary Examiner*—Ramon s. Britts
*Assistant Examiner*—Pamela Anne O'Connor
*Attorney, Agent, or Firm*—Richard C. Litman

[57] ABSTRACT

A guard structure for protecting egress-type alarm control devices. The guard includes a protective barrier having an access opening passing therethrough to permit immediate access to the control device. The guard further includes mounting brackets for mounting the protective barrier to a mounting surface over and in a spaced apart relation from the alarm device.

9 Claims, 5 Drawing Sheets

PROTECTIVE GUARD FOR A SECURITY ALARM DEVICE

BACKGROUND OF THE INVENTION

1. Field of the Invention

The present invention relates to a surface mount static guard structure for protecting security alarm devices such as panic and egress alarm control devices.

2. Description of the Prior Art

Security alarms and their associated control mechanisms are under widespread usage in businesses, such as restaurant and retail establishments, warehouse and storage facilities, and manufacturing and distribution plants. Business operations such as these are continuously moving stock materials and inventory about and more often than not, utilize heavy equipment and machinery to accomplish the task. Security devices for controlling the operation of the alarm system, especially panic and egress devices which are mounted on exit doors, are frequently in the path of moving equipment and transported materials. It is quite common for these control devices to be damaged in the course of business because provisions are not available to protect or guard the same against incidental interaction with persons and/or moving articles. A guard which would protect these devices against exposure to inadvertent contact could prove to be invaluable in the savings of costs or expenses which would otherwise be incurred through the damage of the control devices. Guard devices are known in the prior art, such as for clock faces, illumination devices, and the like. Examples of such devices are shown in U.S. Pat. No. 4,344,114, issued Aug. 10, 1982 to Norbert J. Denhart, and U.S. Pat. No. 5,149,039, issued Sep. 22, 1992 to Bradley J. Peterson et al. Denhart and Peterson et al. each show a surface mount cage for protecting lamps against breakage. Neither of these devices provide an access opening to the device which is subject to potential damage. Further, none of the above inventions and patents, taken either singly or in combination, is seen to describe the instant invention as claimed.

SUMMARY OF THE INVENTION

The present invention relates to a surface mount static guard structure for protecting security alarm devices such as panic and egress alarm control devices. The protective guard includes a static structure forming a protective barrier having an access opening passing therethrough and mounting brackets for mounting the same to a mounting surface over and in a spaced apart relation to the alarm device. The protective barrier is formed from a pair of elongated members spaced apart in a parallel relationship with respect to one another. Laterally extending cross members join the elongated members to one another. The side members terminate in laterally extending surface mount elements. The surface mount elements include apertures passing therethrough for receiving fasteners for fastening the protective guard to a mounting surface. The protective device is formed essentially of a rigid material, preferably a metal or metal alloy, capable of withstanding extreme shock and impact. In use, the protective device is rigidly secured to the door over the egress device so as to permit free travel of the panic bar and permit access to the face of the control device. In this way, the guard absorbs the impact of articles which would otherwise strike the security device and thus, protects the security device from lethal or damaging blows. The device is simple to install and may be installed in a nominal amount of time.

Accordingly, it is a principal object of the invention to provide a surface mount static guard structure for protecting security alarm devices while at the same time providing a immediate access to the security alarm device.

Another object is that the guard include a protective barrier which is mountable to a mounting surface over and in a spaced apart relation to the alarm device and that the guard be formed essentially of a rigid material capable of withstanding stock and impact.

It is another object that the protective device permit free travel of the panic bar.

It is a further object to provide a guard device which is simple to install and which may be installed in a nominal amount of time.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
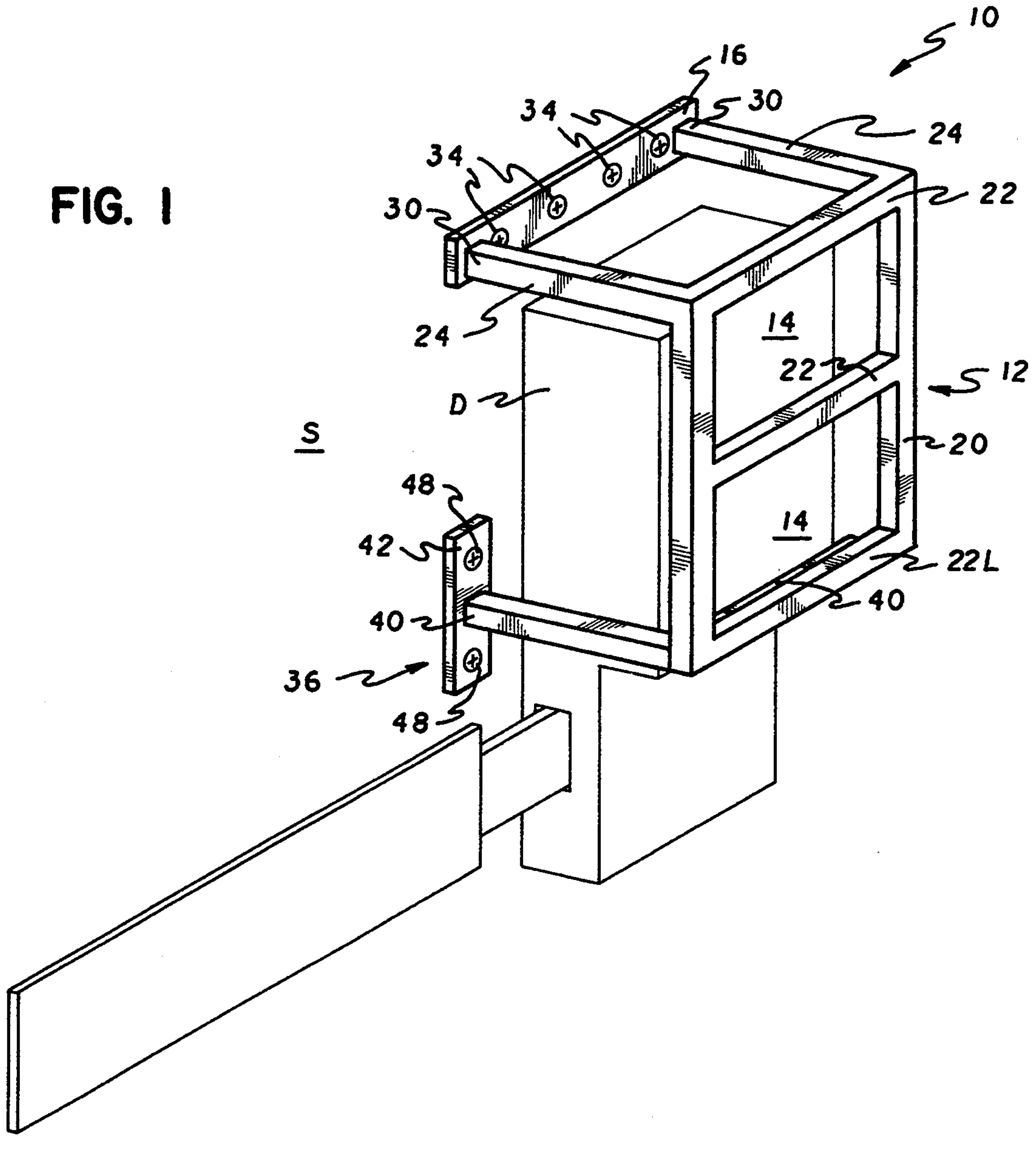
FIG. 1 is an environmental perspective view of a protective guard according to the present invention.
Figure 3:
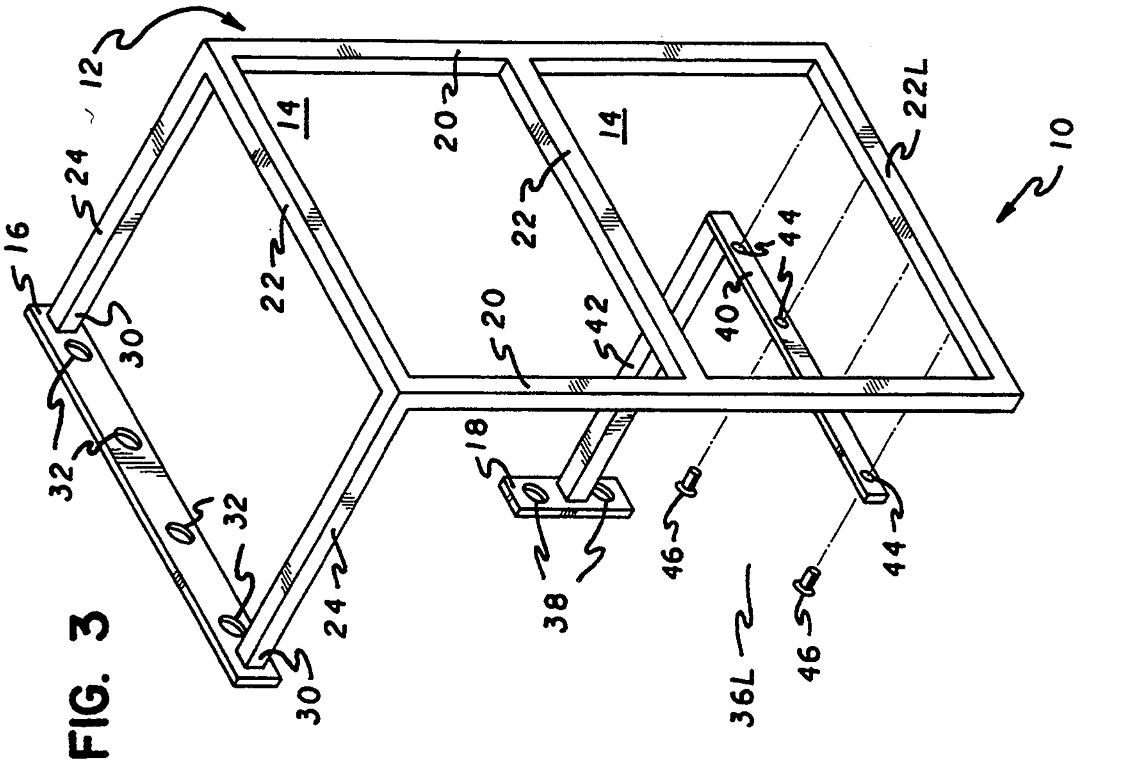
FIG. 3 is an exploded perspective view of the protective guard shown in FIG. 1 wherein the lower mounting bracket is inverted.
Figure 2:
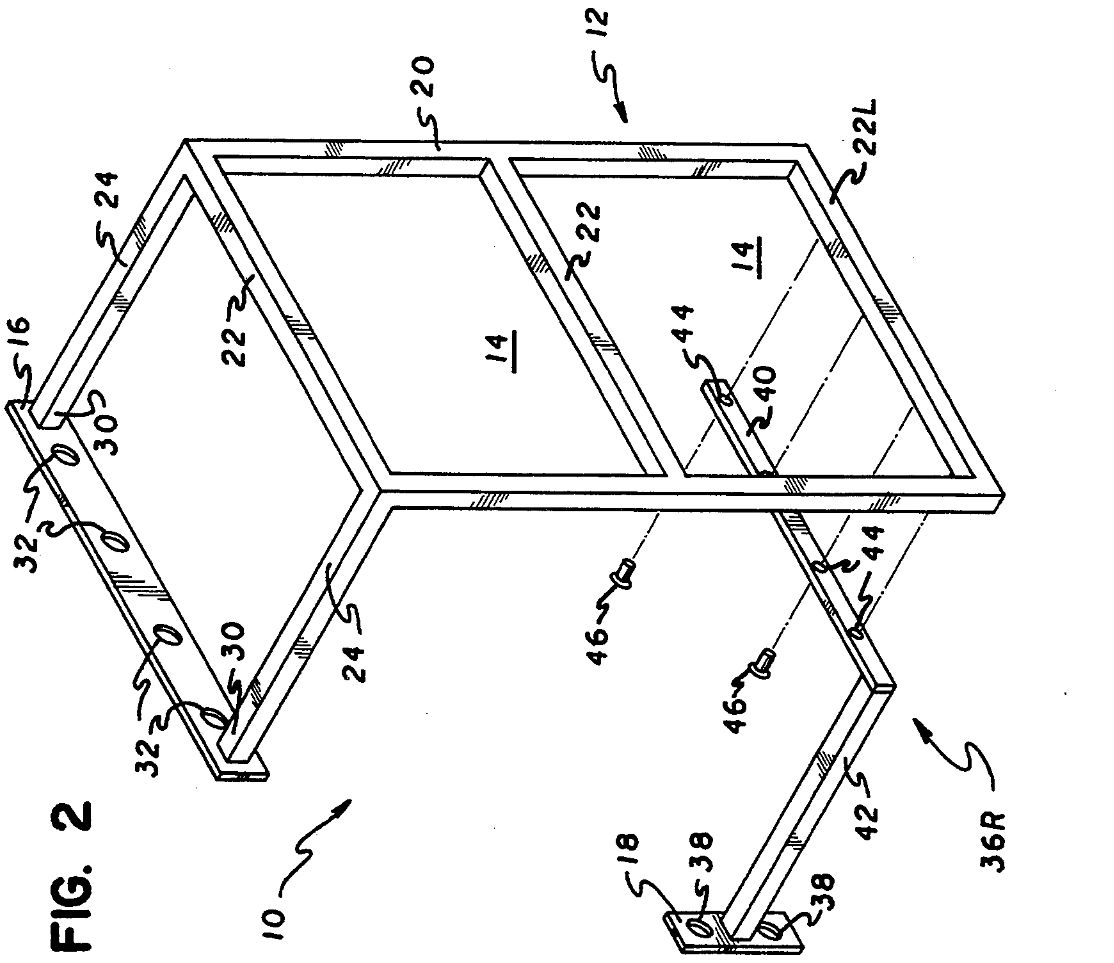
FIG. 2 is an exploded perspective view of the protective guard shown in FIG. 1.

The present invention, as shown in FIGS. 1 through 3, is a protective guard 10 for security alarm devices D and, more particularly, for panic and egress alarm devices. The protective device 10 includes a static structure forming a protective barrier 12 having an access opening 14 passing therethrough and surface mounts 16, 18 for mounting the protective barrier 12 to a mounting surface S over and in a spaced apart relation to the alarm device D.

The protective barrier 12 is formed from a pair of elongated side members 20 spaced apart in a parallel relationship with respect to one another. Laterally extending cross members 22 join the two side members 20 to one another at predetermined intervals so as to form a structural arrangement having a ladder-like appearance. The uppermost portion 24 of each of the side members 20 is angularly disposed substantially at a right angle relative to the anterior portion of the protective barrier 12 so as to form an inverted L-shaped configuration. An upper surface mount element 16 extends laterally and is connected transversely to each of the upper ends 30 of the two side members 20 so as to join the two side members 20 to one another. The upper surface mount element 16 includes a plurality of apertures 32 passing therethrough for receiving fasteners such as the threaded fasteners 34 shown in FIG. 1. Preferably, the apertures 32 are countersunk so as to permit the threaded fasteners 34 to remain flush with the surface of the upper surface mount element 16 upon application of the threaded fasteners 34.

A lower mounting bracket 36 is fashioned in the form of a substantially L-shaped structure including a laterally extending lower surface mount element 18, a laterally extending coupling member 40, and an intermediate member 42 for bridging the lower surface mount element 18 and the coupling member 40. The lower mounting bracket 36, as shown in FIGS. 2 and 3, is configured so as to be interchangeable as both a left mounting bracket 36L and a right mounting bracket 36R. The coupling member 40 is provided with holes 44 for permitting the passage of threaded fasteners 46 therethrough to allow the coupling member 40 to be threadably attached to a lowermost cross member 22L. The surface mount element 18 includes a plurality of openings 38, preferably countersunk openings as shown, for receiving threaded fasteners 48 for securing the surface mount element 18 to a mounting surface S. The upper surface mount element 16 and the lower mounting bracket 36 are arranged to secure the protective barrier 12 to the mounting surface S so as to retain the protective barrier 12 over and spaced apart from the security control device D, thus protecting the security control device D from damage.

Figure 4:
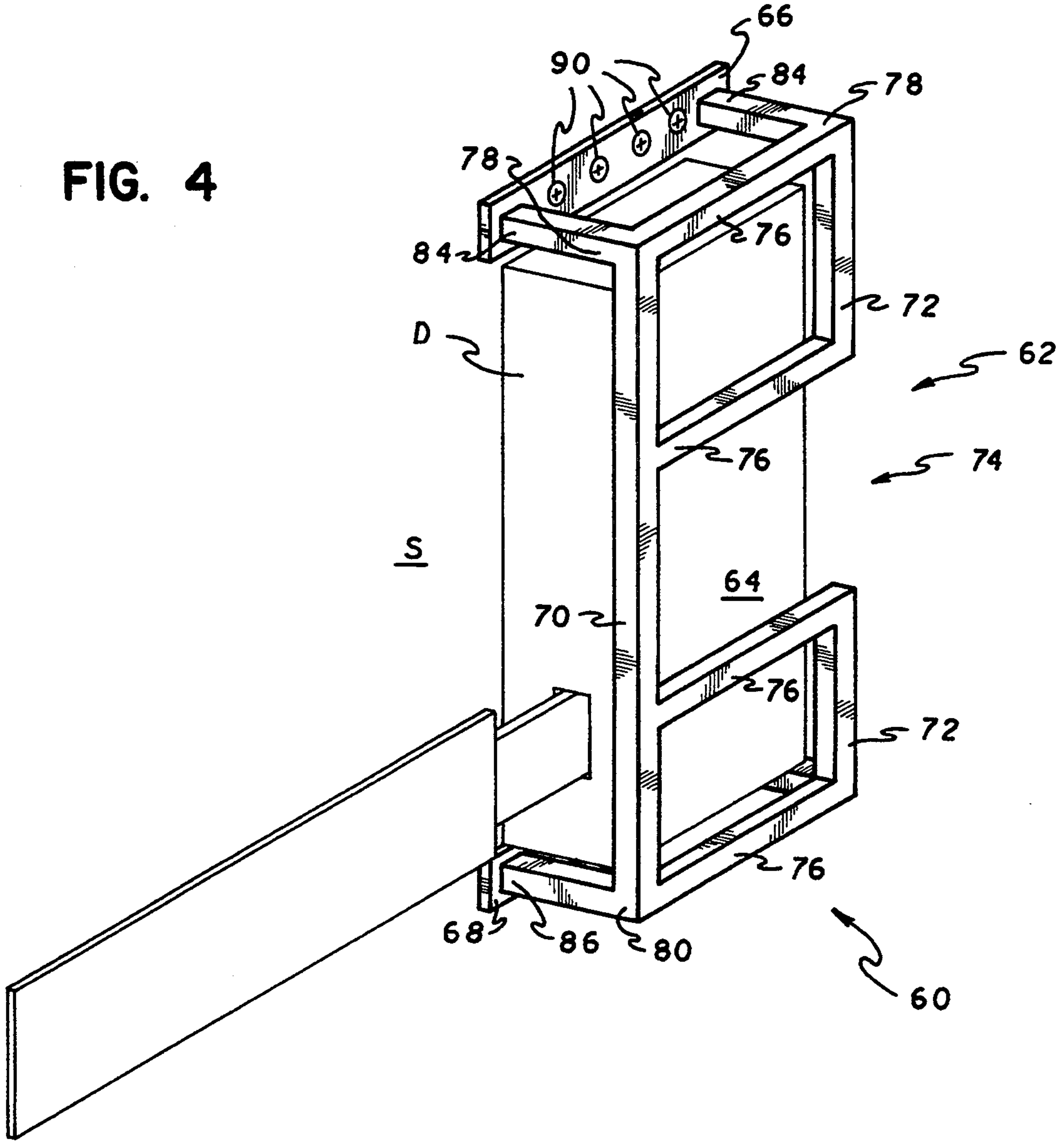
FIG. 4 is an environmental perspective view of an alternative protective guard.
Figure 5:
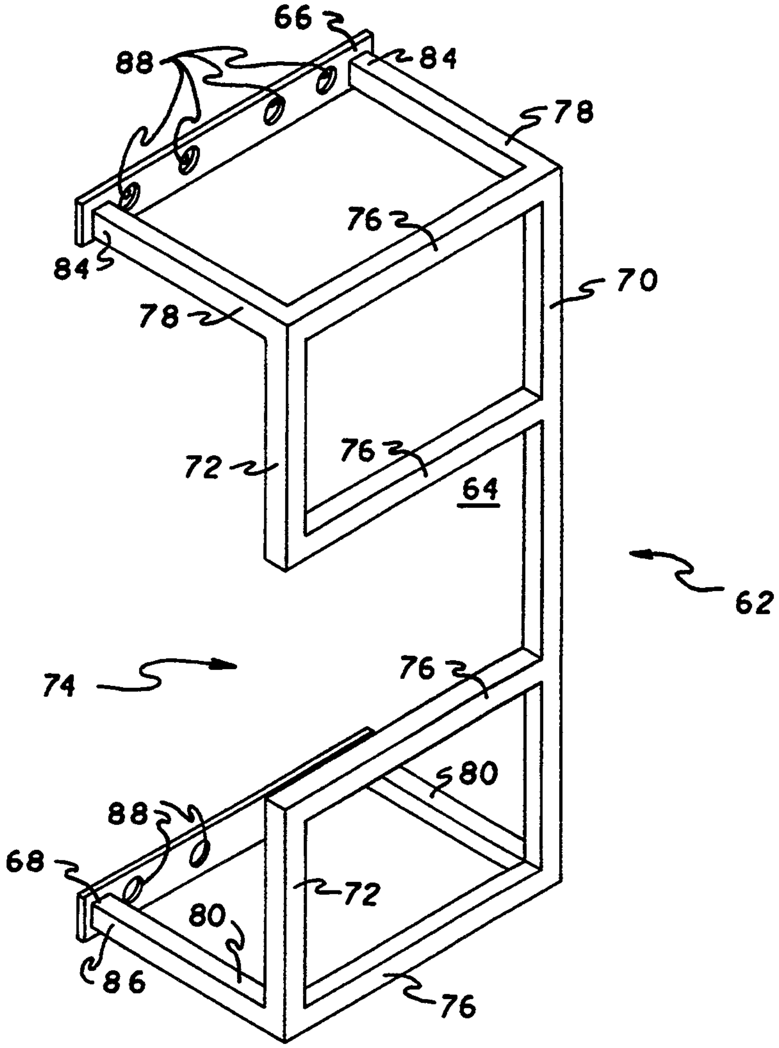
FIG. 5 is a perspective view of the alternative protective guard shown in FIG. 4.

An alternative protective guard 60 is shown in FIGS. 4 and 5. This protective guard 60 includes protective barrier 62 having an access opening 64 and mounting brackets 66, 68 for mounting the protective barrier 62 to a mounting surface S over and in a spaced apart relation to the alarm device D. This particular embodiment is configured so as to be easily inverted to accommodate both right and left swing doors.

The protective barrier 60 is formed from a pair of elongated side members 70, 72 spaced apart in a parallel relationship with respect to one another. One of the side members 70 is continuous and the other side member 72 includes a discontinuous medial portion 74. Laterally extending cross members 76 join the two side members 70, 72 to one another at predetermined intervals. The uppermost and lowermost portions 78, 80 of each of the side members 70, 72 are angularly disposed substantially at a right angle relative to the anterior portion of the protective barrier 62 so as to form a substantially C-shaped configuration. Upper and lower surface mount elements 66, 68 extend laterally and are connected transversely to each of the upper and lower ends 84, 86 of the two side members 70, 72 so as to join the two side members 70, 72 to one another. The surface mount elements 66, 68 each include a plurality of apertures 88 passing therethrough for receiving fasteners such as the threaded fasteners 90 shown in FIG. 4. Preferably, the apertures 88 are countersunk so as to permit the threaded fasteners 90 to remain flush with the surface of the surface mount elements 66, 68 upon application of the threaded fasteners 90. The surface mount elements 66, 68 are configured to secure the protective barrier 60 to the mounting surface S so as to retain the protective barrier 60 over and spaced apart from the security control device D, thus protecting the security control device D against damage.

Figure 6:
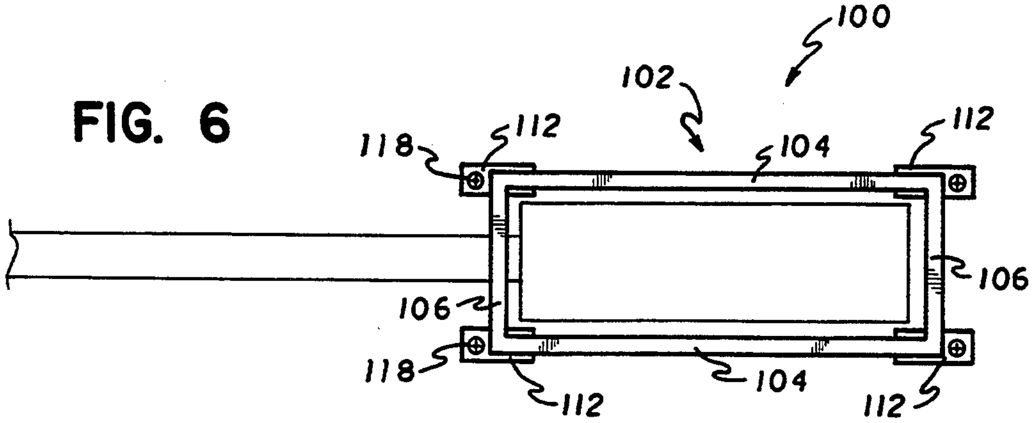
FIG. 6 is an environmental front elevational view of another alternative protective guard.
Figure 7:
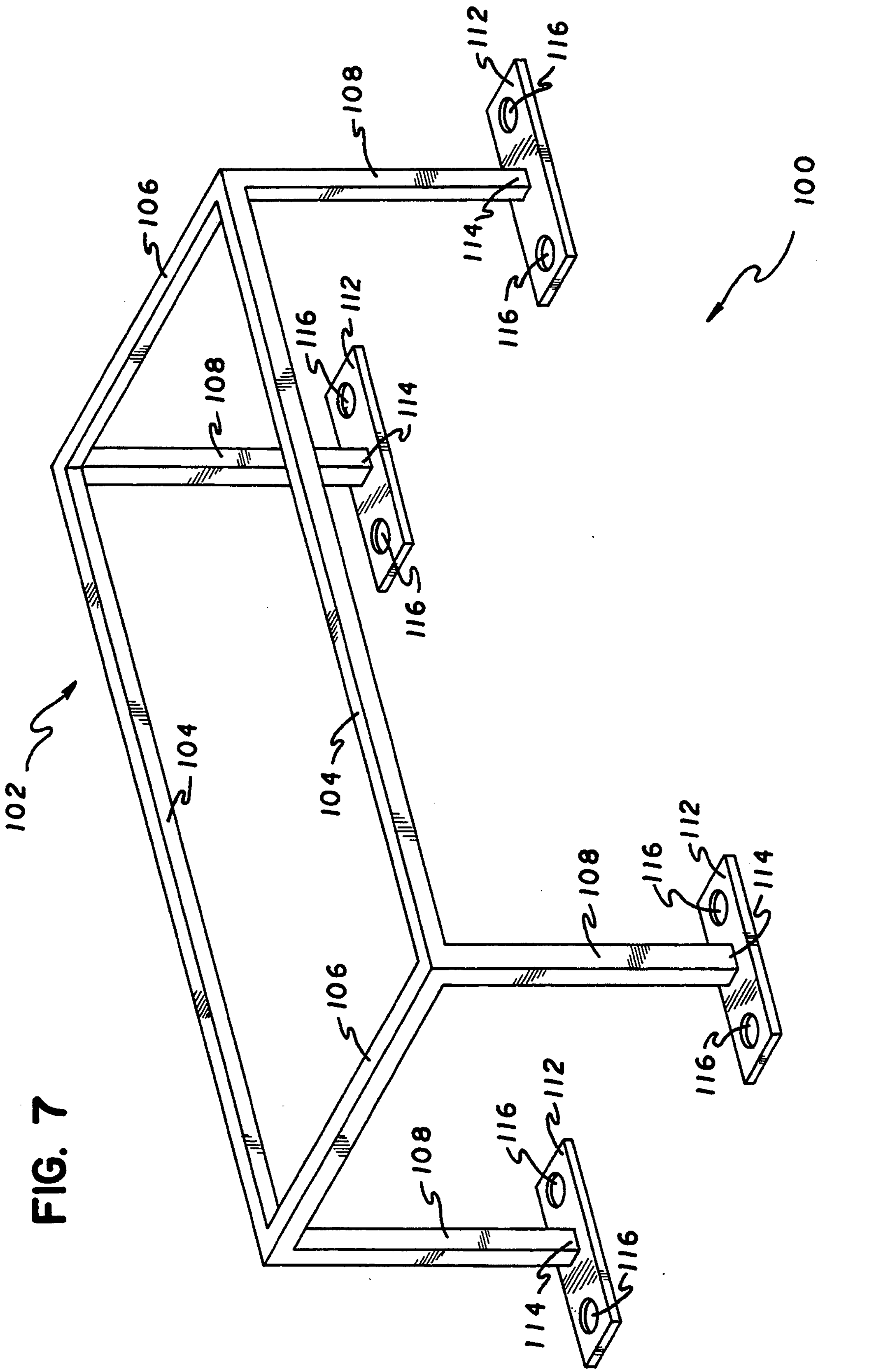
FIG. 7 is a perspective view of the alternative protective guard shown in FIG. 6.

Yet another protective guard 100, as is shown in FIGS. 6 and 7. This protective guard 100 includes a protective barrier 102 having a pair of elongated members 104 spaced apart in a parallel relationship with respect to one another. Laterally extending cross members 106 join the two elongated members 104 to one another at opposite ends of the protective barrier 102. Opposite ends of the elongated members 104 includes angularly disposed portions 108 which are disposed substantially at right angles relative to the anterior portion of the protective barrier 102 so as to form a substantially C-shaped configuration. Surface mount elements 112 are connected independently and transversely to each of the terminal ends 114 of the two elongated members 104. Each surface mount element 112 includes a plurality of apertures 116 passing therethrough for receiving fasteners such as the threaded fasteners 118 shown in FIG. 6. Each of the surface mount elements 112 are configured to independently secure the protective barrier 102 to the mounting surface S so as to retain the protective barrier 102 over and spaced apart from the security control device D, thus protecting the security control device D against damage. This embodiment is configured to be mounted both horizontally and vertically so as to accommodate right and left swing doors and alarm devices D having various types of panic bars.

It is to be understood that the present invention is not limited to the embodiments described above, but encompasses any and all embodiments within the scope of the following claims.

I claim:

1. A protective guard for providing access to a security alarm device, said protective guard comprising:

a pair of side members spaced apart in a parallel relationship with one another, said pair of side members has a first end and a second end;

a plurality of cross members connecting said pair of side members to one another, said plurality of cross members includes a first cross member located proximate to said first end, and a second cross member located proximate to said second end;

a plurality of uppermost portions extending from said first cross member;

an upper support mount connected to said plurality of uppermost portions;

an intermediate member;

coupling means for selectively coupling said intermediate member to said second cross member, said coupling means having a first end and a second end, wherein said intermediate member is located on said first end; and a lower support mount connected to said intermediate member.

2. A protective guard according to claim 1, wherein said upper surface mount includes a plurality of apertures for receiving fasteners for fastening said first upper surface mount to said mounting surface, wherein said first surface mount element is connected to each of said plurality of uppermost portions.

3. A protective guard according to claim 2, wherein said lower support mount includes a second laterally extending lower surface mount element having a plurality of apertures for receiving fasteners for fastening said lower support mount to said mounting surface.

4. A protective guard according to claim 1, wherein said lower support mount having a plurality of apertures for receiving fasteners for fastening said lower support mount to said mounting surface.

5. A protective guard for providing access to a security alarm device, said protective guard comprising:

a first elongated side member;

a plurality of laterally extending cross members including a first cross member located proximate to an end of said first elongated side member, a second cross member located proximate to an opposite end of said first elongated side member, a third cross member and a fourth cross member;

a second elongated side member connecting said first cross member with said third cross member;

a third elongated side member connecting said second cross member with said fourth cross member;

a plurality of uppermost portions extending substantially perpendicularly from said first cross member;

a plurality of lowermost portions extending substantially perpendicularly from said second cross member;

a first surface mount element connected to said plurality of uppermost portions; and a second surface mount element connected to said plurality of lowermost portions.

6. A protective guard according to claim 5, wherein said first surface mount element includes a plurality of apertures for receiving fasteners for fastening said first lower surface mount to said mounting surface; and said second surface mount element includes a plurality of apertures for receiving fasteners for fastening said second lower surface mount to said mounting surface.

7. A protective guard according to claim 5, wherein said first surface mount element joins said plurality of uppermost portions.

8. A protective guard according to claim 5, wherein said second surface mount element joins said plurality of lowermost portions.

9. A protective guard according to claim 7, wherein said second surface mount element joins said plurality of lowermost portions.

* * * * *